US007020464B2

(12) United States Patent
Bahl et al.

(10) Patent No.: US 7,020,464 B2
(45) Date of Patent: Mar. 28, 2006

(54) SYSTEM AND METHOD FOR PROVIDING AGENT-FREE AND NO-PACKET OVERHEAD MOBILITY SUPPORT WITH TRANSPARENT SESSION CONTINUITY FOR MOBILE DEVICES

(75) Inventors: Pradeep Bahl, Redmond, WA (US); Nelamangala Krishanaswamy Srinivas, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 567 days.

(21) Appl. No.: 09/973,341

(22) Filed: Oct. 9, 2001

(65) Prior Publication Data

US 2003/0069016 A1 Apr. 10, 2003

(51) Int. Cl.
*H04Q 7/20* (2006.01)
*G06F 15/16* (2006.01)

(52) U.S. Cl. ................. 455/432.1; 455/433; 455/435.1; 455/445.1; 455/456.1; 709/228; 709/229; 709/239; 709/245

(58) Field of Classification Search .............. 455/432.1, 455/432, 432.2, 432.3, 433, 434, 435.1, 435.2, 455/435.3, 436–440, 404.2, 412.2; 709/228, 709/229, 239, 245
See application file for complete search history.

(56) References Cited

U.S. PATENT DOCUMENTS 6,061,650 A * 5/2000 Malkin et al. .............. 709/229
6,104,929 A * 8/2000 Josse et al. ................. 455/445
6,195,705 B1 * 2/2001 Leung ........................ 709/245
6,230,012 B1 * 5/2001 Willkie et al. ........... 455/435.1

(Continued)

OTHER PUBLICATIONS

Handley et al., "SDP: Session Description Protocol," *Internet Engineering Task Force*, pp. 1–31 (Mar. 2001).
Handley et al., "SIP: Session Initiation Protocol," *Network Working Group*, Request for Comments 2543, pp. 1–153 (Mar. 1999).
Maughan, D., Internet Security Association and Key Management Protocol (ISAKMP), *Network Working Group*, Request for Comments 2408, pp. 1–71 (Nov. 1998).
Orman, H., " The Oakley Key Determination Protocol," *Network Working Group*, Request for Comments 2412, pp. 1–46 (Nov. 1998).
Vakil, F., "Supporting Service Mobility with SIP," *Internet Engineering Task Force*, pp. 1–10 (Dec. 2000).

(Continued)

*Primary Examiner*—William D. Cumming
(74) *Attorney, Agent, or Firm*—Wolf, Greenfield & Sacks, P.C.

(57) ABSTRACT

A system and method for mobility support handles address changes of a mobile host to provide transparent session continuity without packet overhead or the need for assistance of an agent on the network. When the mobile host changes to a new address, its old address is deprecated. The mobile host sends an address change message to each of its correspondent hosts over a secured control channel and preferably through a tunnel created based on the old and new addresses. Upon receiving the notification, the correspondent host returns an acknowledgment through the control channel and modifies its security filters and transport control parameters corresponding to the connection with the mobile host to use the new address. After receiving the acknowledgment, the mobile host modifies its security filters and transport control parameters for the connection to use the new address. As a result, the connection between the mobile host and the correspondent host has migrated to the new mobile host address. The migration is transparent to applications on the mobile and correspondent hosts and without the assistance of an agent.

31 Claims, 7 Drawing Sheets

U.S. PATENT DOCUMENTS

| | | | | | |
|---|---|---|---|---|---|
| 6,360,269 | B1 | * | 3/2002 | Mamros et al. | 709/228 |
| 6,456,621 | B1 | * | 9/2002 | Wada et al. | 455/432.1 |
| 6,505,047 | B1 | * | 1/2003 | Palkisto | 455/456.1 |
| 6,526,033 | B1 | * | 2/2003 | Wang et al. | 455/433 |
| 6,535,493 | B1 | * | 3/2003 | Lee et al. | 455/435.1 |
| 6,574,214 | B1 | * | 6/2003 | Khalil et al. | 455/433 |
| 6,651,105 | B1 | * | 11/2003 | Bhagwat et al. | 709/239 |
| 6,697,354 | B1 | * | 2/2004 | Borella et al. | 455/433 |
| 6,728,536 | B1 | * | 4/2004 | Basilier et al. | 455/433 |

OTHER PUBLICATIONS

Bellovin et al., "On the Use of SCTP with IPsec," *Network Working Group—Internet Draft*, pp. 1–6 (2000) printed at p.potaroo.net/ietf/all–ids/draft–ietf–ipsec–sctp–00.txt.

Johnson et al., "Mobility Support in IPv6," *IETF Mobile IP Working Group—Internet Draft*, pp. 1–149 (Mar. 2002) printed at lug.org/~griswold/Drafts–RFCs/draft–ietf–mobileip–ipv6–16.txt.

Kelly, Scott, "Content Requirements for ISAKMP Notify Messages," *IPSEC Working Group—Internet Draft*, pp. 1–27 (Nov. 2000) printed at ietf.org/proceedings/01mar/I–D/ipsec–notifymsg–04.txt.

Piper, D., "The Internet IP Security Domain of Interpretation for ISAKMP," *Network Working Group*, Request for Comments 2407, pp. 1–32 (Nov. 1998) printed at faqs.org/ftp/rfc/pdf/rfc2407.txt.pdf.

* cited by examiner

SYSTEM AND METHOD FOR PROVIDING AGENT-FREE AND NO-PACKET OVERHEAD MOBILITY SUPPORT WITH TRANSPARENT SESSION CONTINUITY FOR MOBILE DEVICES

TECHNICAL FIELD OF THE INVENTION

This invention relates generally to network communications involving mobile devices, and more particularly to the handling of network communications between a mobile device and other computing devices when the network address of the mobile device changes.

BACKGROUND OF THE INVENTION

With the rapid developments in wireless networking, mobile devices, such as laptop computers, personal digital assistant (PDA) devices, pc companions, high-end cellular phones, etc., are playing an increasingly important role in network communications. Mobile devices typically communicate with other devices by transmitting and receiving data over radio frequency (RF) channels. The wireless nature of the RF communications allows the devices to be mobile, i.e., to move from one place to another without losing the wireless communication links. Through wireless links, a mobile device can communicate with a wired network and other mobile devices through access point devices of the wired network (the "infrastructure mode"), or talk to other mobile devices directly by forming a peer-to-peer network (the "ad hoc mode").

Although the mobility of mobile devices provides great freedom and convenience to their users, there are technical challenges in supporting the mobility of those devices. One major issue is how to maintain session continuity when a mobile device moves around. When a mobile device using TCP/IP for communicating with other devices crosses a boundary between subnets, it may be assigned a new network address. In response to the address change, the TCP/IP stack in the device removes the old IP address. As a result of this modification, however, an application on the mobile device that is communicating with another application on a correspondent device loses any communication context it had associated with the previous address. The application has to restart any activity that was going on based on the previous address. For example, a file transfer or some real-time session that was underway would have to be restarted. To that end, the connection with the correspondent device established using the previous address has to be terminated and a new connection has to be restarted using the new address, and all data buffered for the old connection are lost. As a result, the operating system of the mobile device fails to support seamless mobility, i.e., providing session continuity that is transparent to applications hosted on it.

Several schemes have been proposed for handling mobility transparently by requiring help from an agent (or proxy) on the network. For instance, Mobile IP or SIP (Session Initiation Protocol) based schemes use an agent between a mobile device (called a "mobile host" (MH)) and a device it is communicating with (called a "correspondent host" (CH)). The agent is responsible for tunneling or redirecting packets from the correspondent host to the mobile device when the mobile device changes address. Version 6 of the Mobile IP protocol comes close to being an agent-less scheme but still proposes the use of a home agent to tunnel packets to the mobile device for new nodes that start communicating with the mobile device using its old address when the mobile device is moving and changing addresses. All currently existing schemes to support seamless mobility also entail a packet overhead for every packet that is routed to/from the mobile device after it acquires a new address. The requirement of an agent makes the implementation of the existing mobility support schemes rather complicated, and the increased overhead for the triangular packet routing is not desirable. Also, the permanent packet overhead after the mobile node has changed its address can be oppressive for short packets such as those used for audio streaming. This is especially so when the mobile station is using low bandwidth wireless links

SUMMARY OF THE INVENTION

In view of the foregoing, the present invention provides a system and method for providing mobility support for a mobile host that is agent-free and maintains session continuity during address changes in a way that is transparent to applications on the communicating hosts (i.e., the mobile and correspondent hosts). When the mobile host (MH) changes its address while communicating over a connection with a correspondent host (CH), the old address is deprecated. A mobility service of the mobile host then sends an address change notification message over a secured control channel to the correspondent host. Upon receiving the address change notification message, a mobile service of the correspondent host returns an acknowledgment over the control channel and modifies the security filters and transport control parameters corresponding to the connection with the mobile host to use the new address of the mobile host. In a preferred embodiment, the address change message and the acknowledgment are delivered through a tunnel set up for the control channel based on the new and old addresses of the mobile host. After receiving the acknowledgment, the mobile service of the mobile host modifies the security filters and transport control parameters for the connection with the correspondent host to use the new mobile host address. As a result, the connection between the mobile host and the correspondent host has "migrated" to the new mobile host address, and all subsequent traffic between the mobile host and the correspondent host is sent over the migrated connection and secured by the same security associations used prior to the migration. In this way, the continuity of network communication sessions between an application on the mobile host and another application on the correspondent host over the connection is maintained. The migration of the connection between the mobile and correspondent hosts to the new mobile host address is performed without the assistance of an agent and is done seamlessly and transparently to the applications communicating over the connection.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
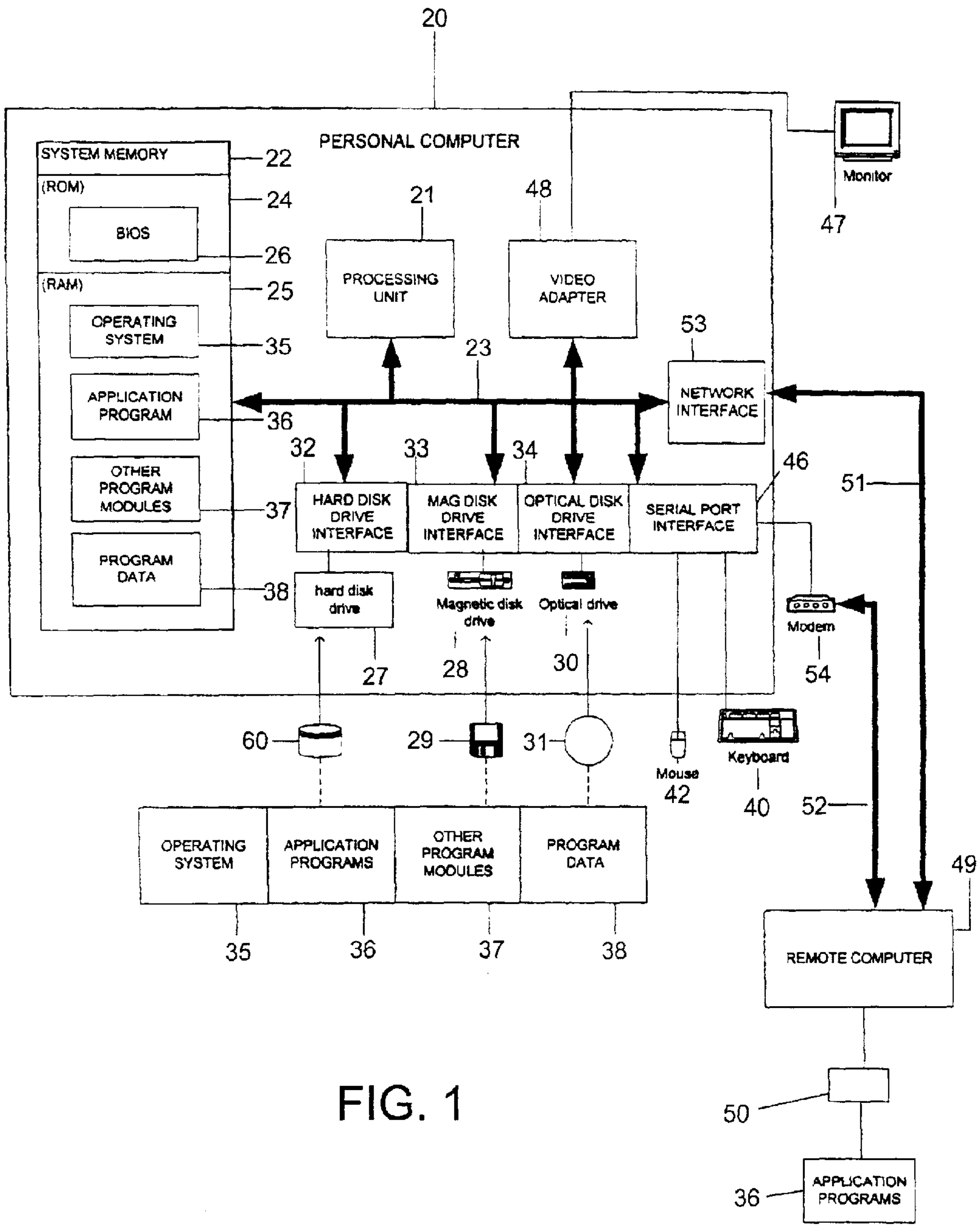
FIG. 1 is a block diagram generally illustrating an exemplary computer system on which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing the invention, and the invention will be described in greater detail with reference to FIGS. 2–4. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, Storage area networks and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40, a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). The commands can also be given over a network through a network card (cable modem, DSL, Ethernet, Token ring, etc). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
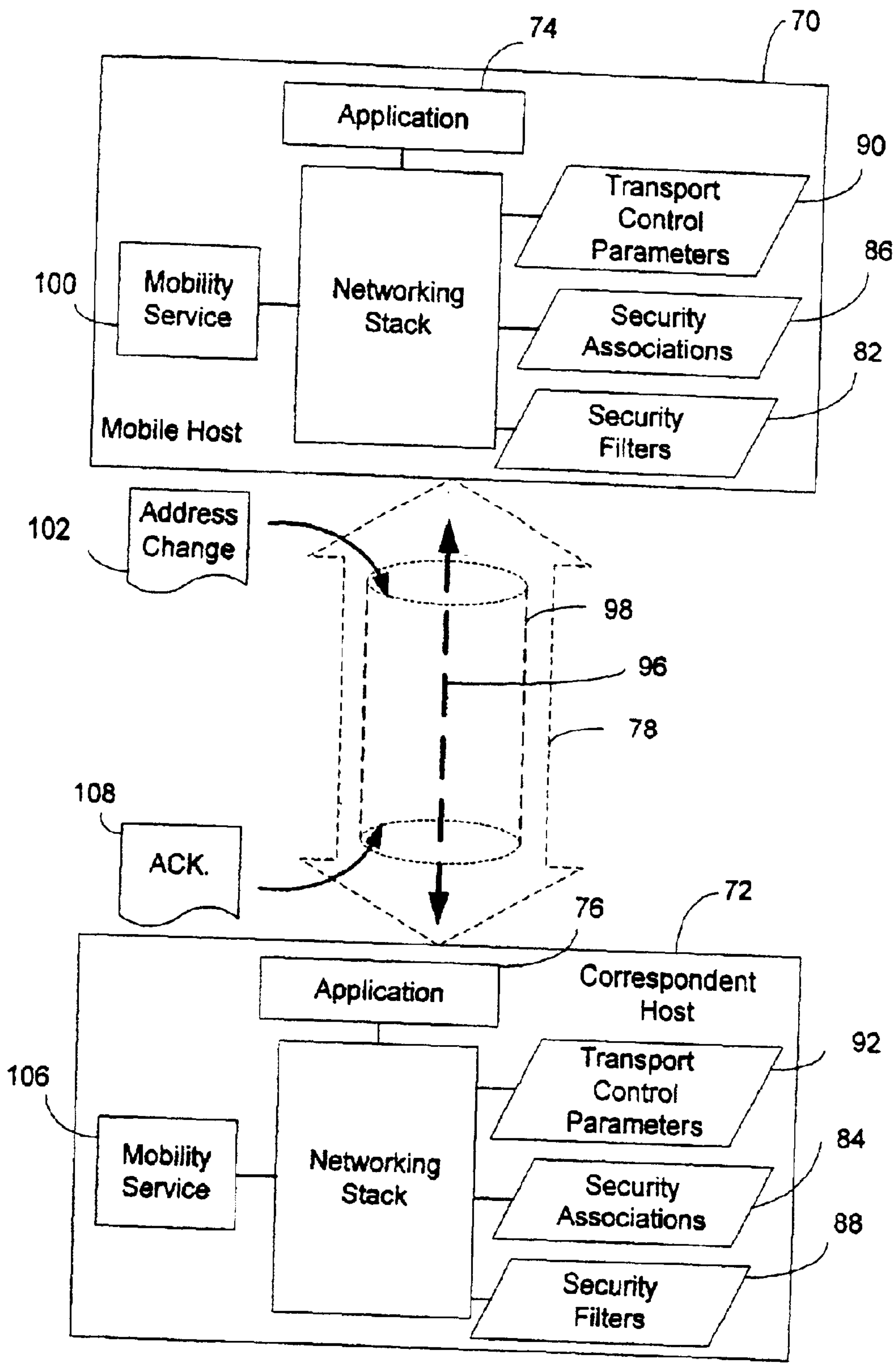
FIG. 2 is a schematic diagram illustrating a mobility support scheme for a mobile device in accordance with an embodiment of the invention.

Referring now to FIG. 2, the present invention is directed to a scheme for supporting the mobility of a mobile host (MH) 70 that is communicating with one or more correspondent hosts (CHs) over wireless connections. For simplicity of illustration, only one correspondent host 72 is shown in FIG. 2. As illustrated in FIG. 2, an application 74 on the mobile host 70 is communicating with an application 76 on the correspondent host 72 over an established connection 78 between the two hosts. The connection 78 has associated security filters 82 and 88 for corresponding security associations 86 and 84 for the connection, and transport control parameters 90 and 92 maintained by the mobile host and correspondent host, respectively. The security filters and the transport control parameters use the current network address of the mobile host for identifying the traffic over the connection between the mobile host and correspondent host. During the course of the communications, the mobile host 70 may move to a new subnet and thus acquire a new network address. The mobility support scheme of the invention allows the mobile host 70 and the correspondent host 72 to handle the mobility host's address change to provide session continuity in a way that is transparent to applications on the two hosts that are communicating over the wireless connection. Moreover, the scheme of the invention does not need the assistance of an agent on the network as required by conventional mobility support schemes.

As explained in greater detail below, this scheme uses a secured control channel 96 between the mobile host 70 and each correspondent host 72, and the implementation of a mobility service in each of the two hosts for handling the address change. The term "control channel" as used herein means an established way for the mobile host 70 to send control messages to notify the correspondent host 72 of the address change and for the correspondent host to acknowledge receipt of the notice. The control channel is secured, such as by means of the implementation of a cryptography-based security protocol, so that the correspondent host 72 can verify that the address change notification message is indeed sent by the mobile host.

Figure 6:
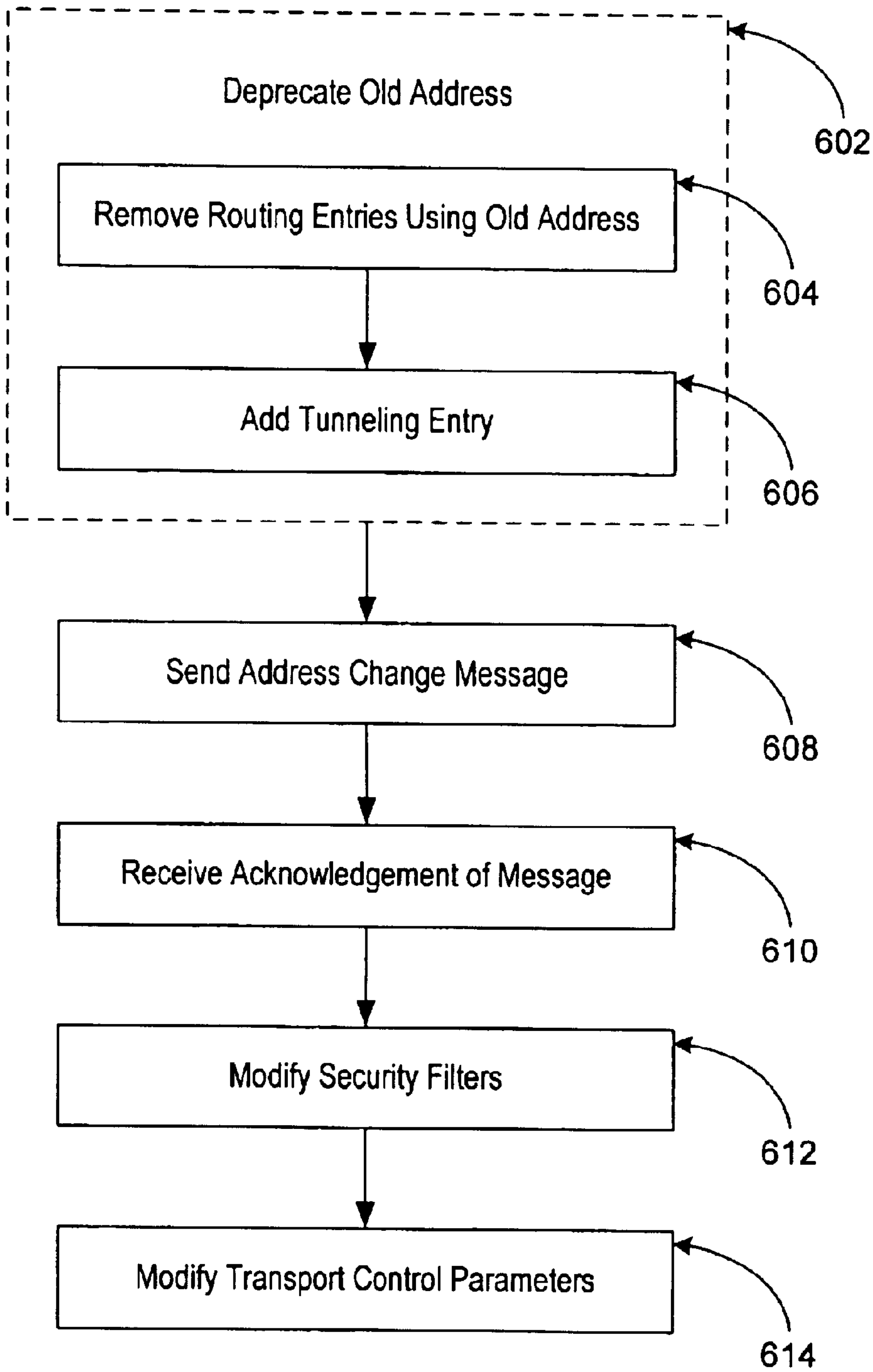
FIG. 6 is a flowchart depicting steps performed by a mobile host in accordance with an embodiment of the invention.

When the mobile host 70 changes to a new address, the networking stack of the mobile host deprecates the old address (see Step 602 at FIG. 6). The mobility service 100 of the mobile host then sends an address change notification message (ACM) 102 to each correspondent host 72 that has a connection with it over a secured control channel 96 established with that correspondent host (see Step 608 at FIG. 6).

In a preferred embodiment, a tunnel 98 is setup for the control channel 96 based on the old and new addresses for purposes of sending the address change notification message and receiving a responsive acknowledgment (ACK) from the correspondent host.

The mobility service 100 of the mobile host then sends an address change notification message 102 through the tunnel to each correspondent host 72 that has a connection with it over the secured control channel 96 established with that correspondent host. The address change notification message 102 contains the mobile host's new address. When the correspondent host 72 receives the address change message 102 (see Step 702 at FIG. 7), it authenticates the message based on security filters 88 set up for the existing connection with the mobile host 70 to verify that the message is indeed from the mobile host. At this point, the security filters 88 on the correspondent host still use the old address of the mobile host, and the tunneling of the message 102 allows the message headers, such as the IP header and the TCP or UDP headers, to pass (i.e., match) the security filters and the transport control parameters in the same way as packets sent by the MH prior to the address change.

Figure 7:
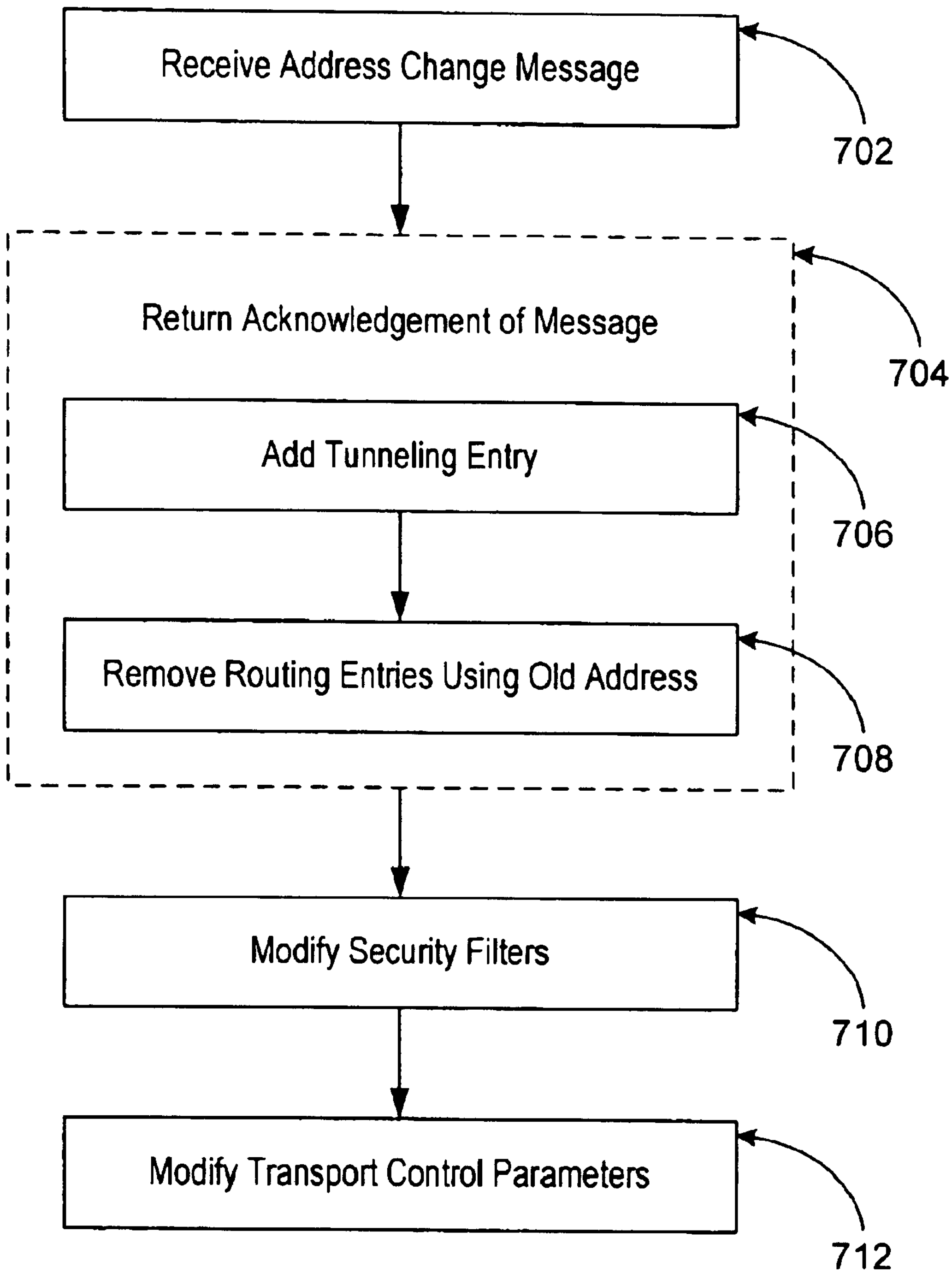
FIG. 7 is a flowchart depicting steps performed by a correspondent host in accordance with an embodiment of the invention.

After authenticating the address change notification message 102, the mobility service 106 of the correspondent host sends an acknowledgment message 108 to the mobile host 70 (see Step 704 at FIG. 7). Like the notification message, the acknowledgment 108 is also tunneled so that it will pass/match the security filters 82 and Transport Control parameters on the mobile host, which are still using the old address of the mobile host. The mobility service 106 of the correspondent host then modifies the security filters 88 (see Step 710 at FIG. 7) and transport control parameters 92 (see Step 712 at FIG. 7) for the connection 78 to use the new address of the mobile host instead of the old address. Thus, any new packets from the application 76 to the mobile host will be sent to the new address of the mobile host. The security association 86 for that connection is otherwise kept the same as before the address change.

Upon receiving and authenticating the acknowledgment 108 (see Step 610 at FIG. 6), the mobility service 100 of the mobile host modifies the security filters 82 (see Step 612 at FIG. 6) and transport control parameters 90 (see Step 614 at FIG. 6) for the connection 78 with the correspondent host. As a result of the changes by the mobility services 100 and 106 of the mobile host and the correspondent host, the communication connection 78 between the two hosts has been "migrated" from the old address of the mobile host to the new address. All subsequent traffic between the mobile host and the correspondent host is sent over the migrated connection, while being secured by the same security associations 86 and 84 used prior to the migration. The migration of the connection is transparent to the applications 74 and 76 that communicate over the connection before, during, and after the handling of the address change. In other words, the applications do not have to be aware of the address change. To them, the connection is always there and the communications are sent through the connection regardless of any address change.

This mobility scheme as described above does not require any help from an agent on the network and thus does not suffer from triangle routing necessitated by the use of an agent. It also does not require tunneling except during the transition period in which the correspondent host is receiving, processing, and responding to the address change notification. Because it calls for end point transitioning to the new address, the scheme has lower overhead than all existing mobility schemes that require encapsulation or extra headers as a permanent overhead on all packets sent after an address change.

In the embodiment described above, a tunnel is set up to carry the control channel for the mobile host and correspondent host to communicate about the address change. Tunneling, however, is not essential. In an alternative embodiment, the mobile host can set up a "non-tunneled" control channel to send the address change notification message and receive the acknowledgment. This control channel can be secured, for instance, using IPSEC by having pre-canned security filters in the mobile and correspondent hosts that state that an IPSEC SA should be setup whenever a TCP/UDP packet is sent from <SrcAddress=*>, <Srcport=*> to <DestAddress=*>, <DestPort=*), where * means wildcard address. When so wildcarded, an IPSEC SA will be created for any source/destination address/port.

It should be noted, however, this scheme is not as flexible as the tunneled SA scheme since in the latter there is no need to require such an all-subsuming security filter. Also, forming a new SA takes up communication cycles and therefore detracts from performance—A new SA to the correspondent host requires around two round trips (4 packets). Also, a non-tunneled control channel approach requires the mobile host to prove to the correspondent host that the non-tunneled control channel is from it only and not from some other node. To do this would require some extra processing at both ends by having the mobile host sign the messages with its "to be migrated" SA's key and the correspondent host to verify that it was signed correctly.

Also, since the application sending the data on the "to be migrated" connections is oblivious to the address change and the migration process, it may send data packets in parallel with the control channel messages. Using tunnels helps in ensuring that data packets that are being sent in parallel with the control channel messages are tunneled also and so do not become lost because of ingress filtering (i.e., the dropping of packets by a router because it is carrying a source address in its outer IP header that does not belong to the subnet the node is on). An implementation of the embodiment of the mobility support scheme illustrated in FIG. 2 is now described with reference to FIG. 3. The embodiment of FIG. 3 leverages existing implementations of services of popular security protocols in the operating system and modifies them to function as the mobility services and to provide the secured control channel. Specifically, in this embodiment, each of the mobile host 120 and correspondent host 122 has an OAKLEY service and an ISAKMP service implemented as part of its operating system. The OAKLEY service is modified to function as the mobility service in the scheme described above with reference to FIG. 2, while an implementation of security measures, namely the ISAKMP security associations (SAs), under the IPSEC protocol provides the secured control channel for passing the address change notification and acknowledgment. It will be appreciated, however, that the invention is not limited to these protocols and can be implemented in other ways. For instance, the mobility service (of FIG. 2) may be implemented as a component separate from the OAKLEY service or the like, and a different secured wire control protocol, such as the SIP (Session Initiation Protocol) or some proprietary protocol, other than the IPSEC protocol may be used to provide the secured control channel.

For purpose of providing some background information to facilitate an understanding of this embodiment, a brief description of the OAKLEY and ISAKMP protocols is provided here. Both OAKLEY and ISAKMP are IETF (Internet Engineering Task Force) standards. OAKLEY is a generic key exchange protocol that generates and manages the keys used to encrypt and decrypt information. Key establishment is the heart of data protection that relies on cryptography, and it is an essential component of packet protection mechanisms. The OAKLEY protocol, which is defined in RFC2412 of IETF, provides such a mechanism based on the Diffie-Hellman key exchange algorithm with some enhancements.

ISAKMP (Internet Security Association and Key Management Protocol), which is defined in the RFC2408 of IETF, defines procedures and packet formats to establish, negotiate, modify, and delete security associations (SAs). Security associations are records that contain the information required for execution of various network security services, such as the IP Security layer services (e.g., header authentication and payload encapsulation), or self-protection of negotiation traffic. ISAKMP defines payloads for exchanging key generation and authentication data. These formats provide a consistent framework for transferring key and authentication data that is independent of the key generation technique, encryption algorithm and authentication mechanism. ISAKMP is intended to support the negotiation of security associations for protocols at all layers of the Open System Interconnection (OSI) stack (i.e., all protocols/applications using the TCP/IP stack, etc.). By centralizing the management of the security associations, ISAKMP prevents duplication of the network security specific functionality within each protocol.

Figure 3:
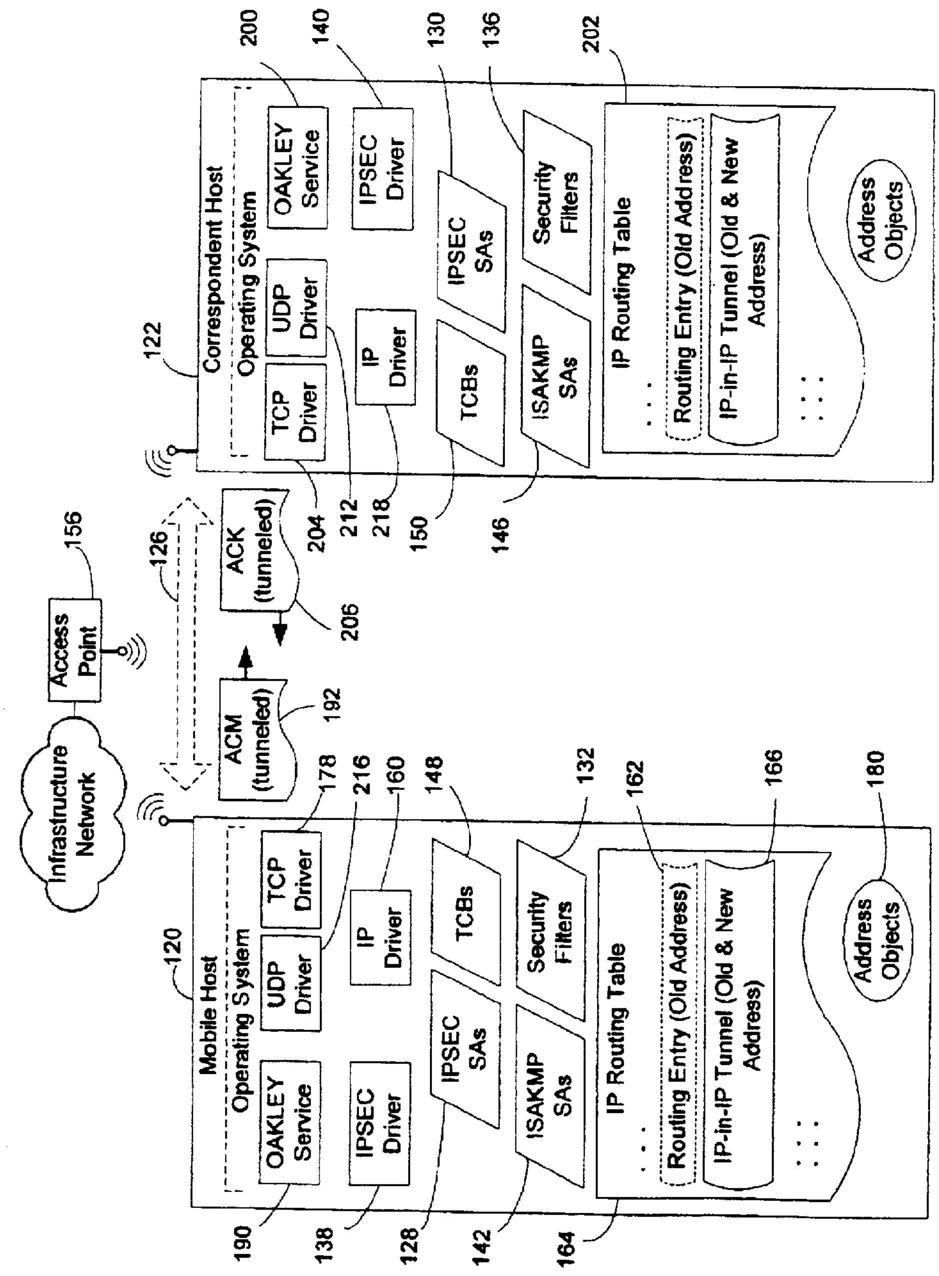
FIG. 3 is a schematic diagram showing an implementation of the mobility support scheme of FIG. 2.
Figure 4A:
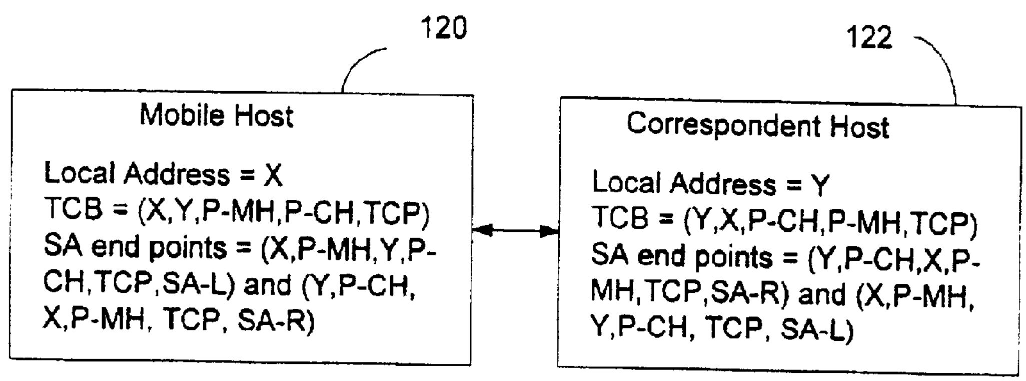
FIGS. 4A and 4B are schematic diagrams showing an example of the contents of security filters and TCP control blocks of a mobile host and a correspondent host before and after an address change of the mobile host.

As shown in FIG. 3, the mobile host 120 forms a TCP connection 126 with the correspondent host 122 under an IPSEC security association 128 according to existing security policies. At both ends (i.e., at both the mobile host and correspondent host), the IPSEC security associations 128 and 130 are associated with bi-directional filters 132 and 136 maintained by the IPSEC drivers 138, 140, respectively. The filters 132 and 136 contain the port and address information specific to the TCP connection 126. All TCP packets matching the filters are encrypted/decrypted using the key and algorithms pertaining to the IPSEC security association for that TCP connection. The IPSEC SA 128 or 130 at each end of the connection is also associated with an ISAKMP SA 142 or 146. The ISAKMP SA is the phase 1 SA established between two machines, and the IPSEC SA is the SA established top of the ISAKMP SA. At each end, the TCP connection is also defined by a TCP control block (TCB) 148 or 150, which contains the transport control parameters for the connection. By way of example, FIG. 4A shows exemplary contents of the TCBs and security filters at the mobile host and the correspondent host prior to an address change of the mobile host. In this example, the address of the mobile host is X and then address of the correspondent host is Y. "P-MH" and "P-CH" stand for the port numbers for the mobile host and the correspondent host, respectively.

Returning to FIG. 3, as illustrated, the mobile host 120 and correspondent host 122 communicate wirelessly through access points 156 of an infrastructure network. As the mobile host 120 moves and changes from one access point to another, it gets the "media disconnect" and "media connect" events. Note that in some implementations, only a media connect may be received. As a result, the mobile host 120 tries to renew its DHCP (Dynamic Host Configuration Protocol) address. If the mobile host has crossed over to a different subnet, the DHCP renewal results in the mobile host's getting a new IP address.

As soon as the mobile host acquires the new address, the mobile host or the DHCP server that gives the MH the new address updates the DNS A and PTR records on the authoritative DNS service. However, non-authoritative DNS servers that have cached the old address will continue to give to their clients the old address until the cache entry times out.

To keep the cache lifetime of such A and PTR records small so that address changes of a mobile node can be picked up quickly by new correspondent hosts, it is preferable that the name of the mobile node is registered with the DNS servers with a "time-to-live" (TTL) (the cache time for the name-address mapping kept by a caching DNS) that is reasonably small.

In response to acquiring the new address, the IP driver 160 in the mobile host marks the old IP address as "DEPRECATED" and raises an "ADDRESS DEPRECATED" PnP (plug-and-play) event notification. The PnP notification is used to let the upper layer transport protocols, such as TCP and UDP, know that the address is deprecated. These Transport protocols will then not allow any new transport end point or connection using the deprecated address to be established. Thus, with the old address in the "DEPRECATED" state, the old address is not returned on any address query and no new connections will be formed to this address.

The deprecated address is an address in transition, one that will soon be deleted, and is used just for purposes of migrating the existing connections.

Figure 5:
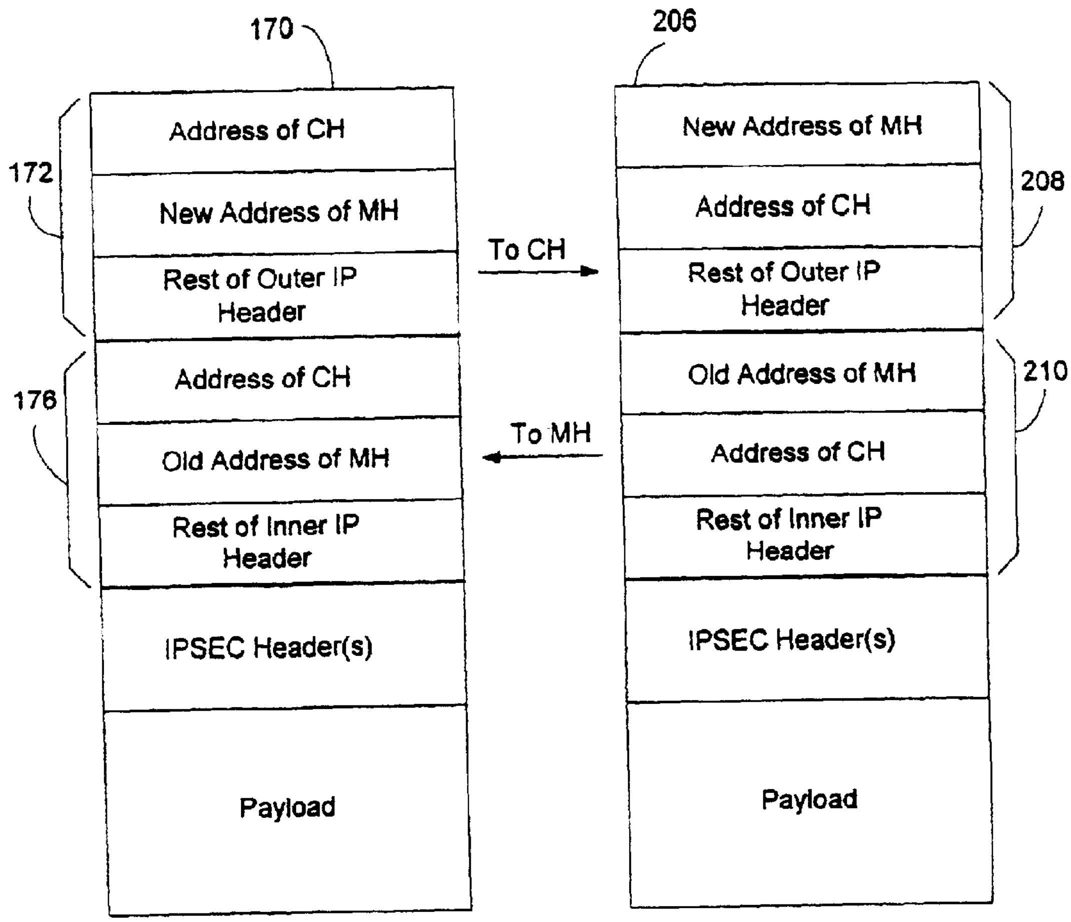
FIG. 5 is a schematic diagram showing the format of the data packets being tunneled between the mobile host and the correspondent host for handling the address change of the mobile device.

Since the old address is deprecated, the IP routing entries 162 corresponding to it are removed from the IP routing table 164 of the mobile host (see Step 604 at FIG. 6). An IP-in-IP tunneling entry 166, however, is created by the mobility service in their place (see Step 606 at FIG. 6). There is one tunneling entry for the old address in place of all earlier entries for the old address in the routing table. This tunnel is created for encapsulating packets that are sent with the old IP address of the mobile host as the source address. Due to the new tunneling entry in the IP routing table, such packets are tunneled. The data structure of such a tunneled packet 170 is shown in FIG. 5. This packet is generated from the original packet by adding an outer IP header 172 that contains the new IP address of the mobile host as the source address, while an inner IP header 176 contains the old address as the source address.

Returning to FIG. 3, when the IPSEC driver 138 of the mobile host receives the "ADDRESS DEPRECATED" PnP notification, it ignores the notification for the moment and does not immediately modify or delete any IPSEC security associations or filters corresponding to the old mobile host address. The TCP driver 178, on the other hand, responds to the PnP notification by making all TCBs 148 whose traffic is IPSEC-secured as "DEPRECATED", but no other change is made to the TCBs at this time. The address objects 180 opened by TCP/IP clients in the TCP and UDP drivers remain associated with the old address. All legacy and address agnostic applications can ignore the PnP notification without any disruption to their network operations.

The OAKLEY service 190, which functions as the mobility service in this embodiment, processes the "ADDRESS DEPRECATED" notification by sending an ISAKMP NOTIFY message 192 with the status "ADDRESS CHANGE" to all the correspondent hosts with which it has security associations to indicate a local address change. Since the old address is still valid on existing address objects in the TCP/IP driver, the address change message (ACM) 192 packet carries the old address as the source address in the IP header.

The tunneled ACM packet sent to a given correspondent host is secured under the existing ISAKMP security association 142 with respect to that correspondent host. At this point, the ISAKMP security association is still associated with the old address filters. The IP driver 160 routes this ACM packet 192 over the IP-in-IP tunnel established in the way described above for such packets. Due to tunneling, the ISAKMP NOTIFY message for the address change carries both the old and new addresses of the mobile host. It also carries the security association ID corresponding to the IPSEC security association.

When the ACM packet 192 reaches the correspondent host, the correspondent host's TCP/IP stack de-tunnels the packet and then authenticates it as part of normal IPSEC processing. As mentioned above, the IPSEC implementation provides the secured control channel for delivering the address change notification from the mobile host. Once authenticated, the packet is delivered to the OAKLEY service 200 on the correspondent host. The OAKLEY service 200 extracts the security association ID and the old and new IP addresses of the mobile host from the packet, and creates and IP-in-IP tunneling entry in the IP routing table 202 based on the pair of old and new addresses (see Step 706 at FIG. 7).

The OAKLEY service 200 then sends a "MIGRATION COMPLETED" ISAKMP NOTIFY message 206 to the old mobile host address. This acts as an acknowledgment to the address change notification message 192 sent by the mobile host. This acknowledgement (ACK) packet 206 is secured by IPSEC under the ISAKMP SA existent for the old address of the mobile host. This packet 206 is tunneled to the mobile host. As shown in FIG. 5, due to the tunneling, the packet 206 is encapsulated such that its outer IP header 208 carries the new mobile host address as the destination address and the inner IP header 210 carries the old mobile host address as the destination address. Returning again to FIG. 3, in addition to sending the acknowledgment packet 206, the OAKLEY service 200 on the correspondent host delivers a "CHANGE FILTERS" PnP event notification to the IPSEC driver 140. This event contains the new address of the mobile host 120. Upon getting the PnP event from the OAKLEY service 200, the IPSEC driver 140 modifies the filters 136 for all the security associations with the mobile host to use the new mobile host address instead of the old one. The OAKLEY service 200 further delivers a "CHANGE TCB" PnP event to the TCP/IP driver 204. In response, the TCP/IP driver 204 changes the TCBs 150 corresponding to the mobile host to use the new address of the mobile host. Once the TCBs 150 are modified, the OAKLEY service 200 tells the IP driver 218 to remove the tunneling entry for the old mobile host address from the routing table 202 (see Step 708 at FIG. 7), as it is no longer needed since all new packets to the mobile host will be addressed to the new mobile host address according to the modified TCBs.

In the mean time, the mobile host 120 waits for the acknowledgment 206 from the correspondent host 122. In this regard, since the ACM and ACK messages (NOTIFY) are UDP messages and therefore not guaranteed to reach the other side the mobile host 120 cannot be certain that a given correspondent host has received the address change notification unless an acknowledgment from that correspondent host is received. In one implementation, the OAKLEY service 190 of the mobile host retries the "ADDRESS CHANGE" NOTIFY message until either it receives a "MIGRATION COMPLETED" NOTIFY message from the correspondent host or a pre-set number of retries have been performed. In the case the retries are exhausted, the OAKLEY service assumes that the connection with the correspondent host is already lost and tells the IP driver to delete the old address. In the case of the correspondent host, the ACK to the ACM message can be sent a preset number of times to increase the probability that the mobile host will get it.

Upon receiving the tunneled acknowledgment message 206 from the correspondent host, the mobile host's TCP/IP stack de-tunnels the packet. The IPSEC driver 138 on the mobile host authenticates the de-tunneled packet as part of the normal IPSEC processing. Since the filters 132 for the IPSEC security associations on the mobile host still use the old address, the acknowledgment is authenticated properly. The acknowledgment packet is then delivered to the OAKLEY service 190 of the mobile host.

Once it receives the acknowledgment packet, the OAKLEY service 190 delivers a "CHANGE FILTERS" PnP event notification to the IPSEC driver 138 of the mobile host. In response to this notification, the IPSEC driver 138 changes its filters 132 for the security associations for the connection with the correspondent host to use the new local (i.e., mobile host) address instead of the old one. Note that the "CHANGE FILTERS" event is specific to the security associations with the particular correspondent host that sent the acknowledgment. The "CHANGE FILTERS" PnP notification for the other correspondent host nodes will be triggered separately for each correspondent host only after the mobile host has received an acknowledgment of the address change from that correspondent host.

The OAKLEY service 190 of the mobile host also delivers a "CHANGE TCB" event to the TCP driver 178. Like the "CHANGE FILTERS" event, this "CHANGE TCB" event is also specific to the correspondent host that has sent the acknowledgment. In response, the TCP/IP driver 178 changes the TCBs 148 for the connection with the correspondent host to use the new local address instead of the old address, and the modified TCBs are moved from the "DEPRECATED" state to the "ACTIVE" state. The OAKLEY service 190 also deletes the old IP address through an IP API (Application Program Interface) helper function. As a result, the IP driver 160 removes the tunneling entry 166 corresponding to the DEPRECATED address and loses that address completely.

Figure 4B:
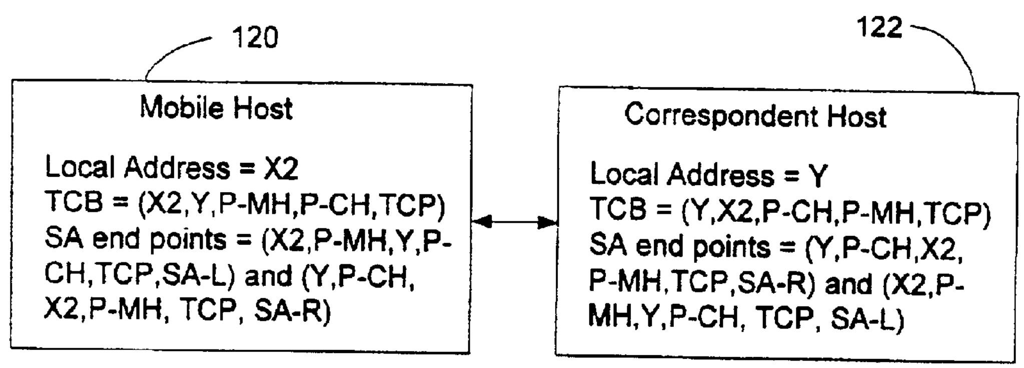

At this point, both ends of the connection 126, namely the mobile host and correspondent host, have changed their respective TCBs and SA filters from the old mobile host address to the new address. An example of the changed TCBs and SA filters is shown in FIG. 4B. In this example, the address of the mobile host has changed to X2.

All traffic over the "migrated" connection now uses the new IP address of the mobile host and is secured using the same security association context as before. This mobility handling operation is transparent to the client applications on the mobile host and the correspondent host that communicate over the connection. Any un-acknowledged packets buffered at either end of the TCP connection, including packets lost during the transition phase, will automatically be retried as part of the normal TCP processing. These packets will now carry the new IP address of the mobile host.

It should be noted that since the migration process takes some time to complete, the mobile host has to hold onto the old address for a while even though it has moved to another subnet and has obtained a new address. The mobile host can hold onto its old address if it knows that the old address has not expired yet. It will know of this if the address is a DHCP address since the MH would then have the lease time for that address, or if the address is a static address that does not expire. In one implementation, when a node changes its address because of roaming/mobility, it starts a timer with a timeout interval equal to the time left until expiry of the old address. If the timer fires, the old TCBs and the SA filters corresponding to the old address are simply deleted. The tunnel interfaces are also removed, thus avoiding the possibility of traffic conflicts at a remote end caused by two nodes using the same address. A reliable NOTIFY termination status message is sent prior to the above cleanup to inform the remote end to do the corresponding cleanup of its TCBs and SA filters.

Alternatively or additionally, a scheme may be adopted to allow a mobile host that gets a new address just before or at the time its old address expires to hold on to that address a bit longer. In this scheme, the TCBs and SA filters stay active with the old address for a maximum of OLD_ADDRESS_TIMED_WAIT time after the mobile host loses the old address. This time duration should long enough to allow sufficient time for the connections and the SA filters to migrate to the new address. If during this time period another node that has acquired the mobile host's old address makes an IPSEC secured or unsecured connection to the correspondent host, it will fail in the attempt due to the conflicts with the existing security association and TCB for that address. As a result, the node that acquired the old address of the mobile host will not be able to establish a conflicting TCP connection until the TCBs and the IPSEC filters either expire or have migrated to the new address. As another alternative, the DHCP server may also be configured not to give out an old expired address for a certain amount of time (holding time) after its expiration.

Although the mobility scheme as implemented in the embodiment is explained above for the scenario in which a mobile host changes its address while the address of the correspondent host stays constant, the scheme also mostly works for the case where the addresses of both ends of the connection change concurrently. In that case, the OAKLEY services on the mobile and correspondent hosts notify their respective IPSEC and TCP drivers to change both the local and remote addresses in the SA filters and TCBs.

There is, however, a corner case for which an additional step is required. That case is when the correspondent host changes its address around the same time as the mobile host and so does not get the ACM message sent to its old address by the mobile host. The additional step required to handle this case is for the mobile host, on not getting the Migration Completed ACK to its ACM message, to query the domain name service (DNS) (since each node updates the DNS with a small time-to-live (TTL) as soon as its address changes) for the correspondent host's address. On getting the new address from the DNS (the mobile host can retry for TTL amount (a hard-coded time interval known to all hosts using this invention) of time if the TTL is small to ensure that it gets the new address and not the cached old address from its local DNS), the mobile host sends the tunneled ACM packet using the new address, instead of the old address, of the correspondent host as the destination address in the outer IP header.

In the embodiment described above, the connection between the mobile host and correspondent host is established under the TCP. It will be appreciated, however, the mobility support scheme of that embodiment can be easily applied to other transport protocols, such as the UDP (User Datagram Protocol), with some minor modifications. For instance, in an embodiment where the connection is based on the UDP, the UDP driver 212 of the mobile host transitions its existing address objects to "DEPRECATED" upon getting the "ADDRESS DEPRECATED" event. The OAKLEY services on the correspondent host and mobile host raise the "ADDRESS CHANGE" event along with the "CHANGE TCB" event. This event at the correspondent host causes the UDP driver 216 to change the destination address of its connected UDP sockets to the new mobile host address. The event on the mobile host causes the UDP driver to change the local address on its address objects.

In view of the many possible embodiments to which the principles of this invention may be applied, it should be recognized that the embodiment described herein with respect to the drawing figures is meant to be illustrative only and should not be taken as limiting the scope of invention. For example, those skilled in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. At least one computer-readable medium having computer-executable instructions for performing steps for handling an address change of a mobile host communicating with a correspondent host over an existing connection, the steps comprising:

deprecating, by the mobile host, an old address of the mobile host;

sending, by the mobile host, an address change message to the correspondent host over a secured control channel, the secured control channel implemented with a cryptography-based security protocol, the cryptography-based security protocol comprising the address change message;

returning, by the correspondent host upon receiving the address change message, an acknowledgment to the mobile host over the secured control channel;

modifying, by the correspondent host, security filters and transport control parameters maintained by the correspondent host for the connection with the mobile host to use the new address of the mobile host;

modifying, by the mobile host upon receiving the acknowledgment from the correspondent host, security filters and transport control parameters maintained by the mobile host for the connection to use the new address of the mobile host.

2. The at least one computer-readable medium as in claim 1, wherein the step of deprecating includes removing routing entries using the old address from a routing table of the mobile host and adding a tunneling entry based on the old and new addresses in the routing table, and wherein the step of sending transmits the address change message through the tunnel, and the step of returning transmits the acknowledgment through the tunnel.

3. The at least one computer-readable medium as in claim 1, wherein the cryptography-based security protocol is an internet protocol security (IPSEC) protocol.

4. The at least one computer-readable medium as in claim 1, wherein the steps of sending the address change message and modifying by the mobile host are performed by a mobility service of the mobile host, and the steps of returning the acknowledgment and modifying by the correspondent host are performed by a mobility service of the correspondent host.

5. The at least one computer-readable medium as in claim 4, wherein the mobility services of the mobile host and the correspondent host are OAKLEY cryptographic key exchange protocol services.

6. The at least one computer-readable medium as in claim 2, the step of modifying by the mobile host includes removing the tunneling entry from the routing table.

7. The at least one computer-readable medium as in claim 1, wherein the connection between the mobile host and the correspondent host is established under the Transmission Control Protocol (TCP).

8. The at least one computer-readable medium as in claim 1, wherein the connection between the mobile host and the correspondent host is established under the User Datagram Protocol (UDP).

9. The at least one computer-readable medium as in claim 1, wherein the step of modifying by the correspondent host includes maintaining security filters and transport control parameters using the old address of the mobile host active during a pre-selected period of time.

10. The at least one computer-readable medium as in claim 1, wherein the computer-executable instructions are part of a computer operating system.

11. A computer-readable medium having computer-executable instructions for performing steps by a mobile host communicating with a correspondent host over an existing connection to handle an address change of the mobile host from an old address to a new address, the steps comprising:

deprecating the old address;

sending an address change message to the correspondent host over a secured control channel, the secured control channel implemented with a cryptography-based security protocol, the cryptography-based security protocol comprising the address change message;

receiving an acknowledgment of receipt of the address change message from the correspondent host over the secured control channel; and modifying security filters and transport control parameters maintained by the mobile host for the connection to use the new address of the mobile host.

12. A computer-readable medium as in claim 11, wherein the step of deprecating includes removing routing entries using the old address from a routing table of the mobile host and adding a tunneling entry based on the old and new addresses in the routing table, and wherein the step of sending transmits the address change message through the tunnel, and the step of receiving receives the acknowledgment through the tunnel.

13. A computer-readable medium as in claim 11, wherein the cryptography-based security protocol is an internet protocol security (IPSEC) protocol.

14. A computer-readable medium as in claim 12, wherein the steps of sending the address change message and modifying the transport control parameters and the security filters are performed by a mobility service of the mobile host.

15. A computer-readable medium as in claim 14, wherein the mobility service of the mobile host is an OAKLEY cryptographic key exchange protocol service.

16. A computer-readable medium as in claim 12, wherein the step of modifying includes removing the tunneling entry from the routing table.

17. A computer-readable medium as in claim 11, wherein the connection with the correspondent host is established under the Transmission Control Protocol (TCP).

18. A computer-readable medium as in claim 11, wherein the connection with the correspondent host is established under the User Datagram Protocol (UDP).

19. A computer-readable medium as in claim 11, wherein the computer-executable instructions are part of a computer operating system.

20. A computer-readable medium having computer-executable instructions for performing steps by a correspondent host communicating with a mobile host over an existing connection to handle an address change of the mobile host from an old address to a new address, the steps comprising:

receiving an address change message from the mobile host over a secured control channel, the secured control channel implemented with a cryptography-based security protocol, the cryptography-based security protocol comprising the address change message;

returning an acknowledgment of receipt of the address change message to the mobile host over the secured control channel;

modifying security filters and transport control parameters maintained by the correspondent host for the connection with the mobile host to use the new address of the mobile host.

21. A computer-readable medium as in claim 20, wherein the step of receiving receives the address change message through a tunnel based on the old and new addresses of the mobile host, and the step of returning includes removing routing entries using the old address from a routing table of the correspondent host and adding a tunneling entry based on the old and new addresses in the routing table for delivering the acknowledgement through the tunnel.

22. A computer-readable medium as in claim 20, wherein the security protocol is an internet protocol security (IPSEC) protocol.

23. A computer-readable medium as in claim 21, wherein the steps of returning and modifying are performed by a mobility service of the correspondent host.

24. A computer-readable medium as in claim 22, wherein the mobility service of the correspondent host is an OAKLEY cryptographic key exchange protocol service.

25. A computer-readable medium as in claim 21, wherein the step of modifying includes removing the tunneling entry from the routing table.

26. A computer-readable medium as in claim 20, wherein the connection is established under the Transmission Control Protocol (TCP).

27. A computer-readable medium as in claim 20, wherein the connection is established under the User Datagram Protocol (UDP).

28. A computer-readable medium as in claim 20, wherein the step of modifying by the correspondent host includes maintaining security filters and transport control parameters using the old address of the mobile host active during a pre-selected period of time.

29. A computer-readable medium as in claim 20, wherein the computer-executable instructions are part of a computer operating system.

30. A method for handling an address change of a mobile host communicating with a correspondent host over an existing connection, comprising the steps of:

deprecating, by the mobile host, an old address of the mobile host;

sending, by the mobile host, an address change message to the correspondent host over a secured control channel, the secured control channel implemented with a cryptography-based security protocol, the cryptography-based security protocol comprising the address change message;

returning, by the correspondent host upon receiving the address change message, an acknowledgment to the mobile host over the secured control channel;

modifying, by the correspondent host, security filters and transport control parameters maintained by the correspondent host for the connection with the mobile host to use the new address of the mobile host;

modifying, by the mobile host upon receiving the acknowledgment from the correspondent host, security filters and transport control parameters maintained by the mobile host for the connection to use the new address of the mobile host.

31. A method as in claim 30, wherein the step of deprecating includes removing routing entries using the old address from a routing table of the mobile host and adding a tunneling entry based on the old and new addresses in the routing table, and wherein the step of sending transmits the address change message through the tunnel, and the step of returning transmits the acknowledgment through the tunnel.

* * * * *